United States Patent
Guignard et al.

(10) Patent No.: US 8,050,565 B2
(45) Date of Patent: Nov. 1, 2011

(54) MULTISERVICE PRIVATE NETWORK AND INTERFACE MODULES FOR TRANSPORTING, ON SUCH A NETWORK, DATA IN DIFFERENT FORMATS

(75) Inventors: Philippe Guignard, Pleumeur-Bodou (FR); Maryse Moignard, Trebeurden (FR); Philippe Chanclou, Lannion (FR)

(73) Assignee: France Telecom, Paris (FR)

( * ) Notice: Subject to any disclaimer, the term of this patent is extended or adjusted under 35 U.S.C. 154(b) by 899 days.

(21) Appl. No.: 11/631,499

(22) PCT Filed: Jul. 1, 2005

(86) PCT No.: PCT/FR2005/001706
§ 371 (c)(1),
(2), (4) Date: Jan. 3, 2007

(87) PCT Pub. No.: WO2006/013274
PCT Pub. Date: Feb. 9, 2006

(65) Prior Publication Data
US 2008/0019691 A1 Jan. 24, 2008

(30) Foreign Application Priority Data
Jul. 1, 2004 (FR) .................................... 04 51385

(51) Int. Cl.
*H04B 10/20* (2006.01)
(52) U.S. Cl. .................... 398/89; 398/58; 398/74
(58) Field of Classification Search .................. 398/138, 398/58–72; 385/24
See application file for complete search history.

(56) References Cited

U.S. PATENT DOCUMENTS

| | | | | |
|---|---|---|---|---|
| 4,555,810 A * | 11/1985 | Khoe et al. | ....................... | 398/58 |
| 4,857,727 A * | 8/1989 | Lenz et al. | ..................... | 398/168 |
| 5,058,101 A * | 10/1991 | Albanese et al. | ................ | 398/73 |
| 5,136,411 A * | 8/1992 | Paik et al. | ........................ | 398/72 |
| 5,144,466 A * | 9/1992 | Nakamura et al. | ............... | 398/51 |
| 5,202,780 A * | 4/1993 | Fussanger | ........................ | 398/72 |
| 5,337,175 A * | 8/1994 | Ohnsorge et al. | ................ | 398/72 |
| 5,343,314 A * | 8/1994 | Nakamura et al. | ............... | 398/51 |
| 5,369,515 A * | 11/1994 | Majima | ........................... | 398/59 |
| 5,404,241 A * | 4/1995 | Ota | ................... | 398/63 |

(Continued)

OTHER PUBLICATIONS

Chang-Joon et al., "A new ATM PON system suitable for local access and local private networking services", Optical Fiber Communication Conference, Technical Digest Postconference Edition, Anaheim, CA, Mar. 17-22, 2001, Trends in Optics and Photonics Series, vol. 54, No. 3, pp. 1-3, 2001.

(Continued)

*Primary Examiner* — Danny Leung
(74) *Attorney, Agent, or Firm* — Drinker Biddle & Reath LLP (57) ABSTRACT

A multiservice private network and interface modules (M1-M5). Each of said modules is dedicated to interfacing a specific terminal equipment (T1-T4, GTW; 310-380) in the multiservice private network. The interface modules (M1-M5) are connected to the terminal equipment on a one-to-one basis. Each interface module (M1-M5) is configured to send and/or receive data in a format adapted to the terminal equipment to which it is connected, at a specific wavelength, in order to interconnect, via said private network, at least two mutually compatible terminal equipments among all the terminal equipments. This arrangement is typically applicable in particular to interconnecting, via a common network, heterogeneous different terminal equipments, so that the mutually compatible terminals communicate directly with one another without interfering with communication between other terminals of a different type.

6 Claims, 3 Drawing Sheets

U.S. PATENT DOCUMENTS

| | | | | | |
|---|---|---|---|---|---|
| 5,446,572 | A | * | 8/1995 | Husbands et al. | 398/89 |
| 5,448,388 | A | * | 9/1995 | Ohde et al. | 398/43 |
| 5,453,865 | A | * | 9/1995 | Faulkner et al. | 398/9 |
| 5,469,283 | A | * | 11/1995 | Vinel et al. | 398/71 |
| 5,510,923 | A | * | 4/1996 | Philippe et al. | 398/51 |
| 5,521,732 | A | * | 5/1996 | Nishio | 398/51 |
| 5,563,728 | A | * | 10/1996 | Allen et al. | 398/126 |
| 5,602,663 | A | * | 2/1997 | Hamaguchi et al. | 398/79 |
| 5,615,033 | A | * | 3/1997 | Yoshida et al. | 398/15 |
| 5,663,818 | A | * | 9/1997 | Yamamoto et al. | 398/58 |
| 5,771,111 | A | * | 6/1998 | Domon et al. | 398/76 |
| 5,801,861 | A | * | 9/1998 | Majima | 398/95 |
| 5,841,556 | A | * | 11/1998 | Hong et al. | 398/46 |
| 5,847,852 | A | * | 12/1998 | Domon et al. | 398/74 |
| 5,864,415 | A | * | 1/1999 | Williams et al. | 398/72 |
| 5,880,864 | A | * | 3/1999 | Williams et al. | 398/71 |
| 5,983,068 | A | * | 11/1999 | Tomich et al. | 725/32 |
| 6,032,185 | A | * | 2/2000 | Asano | 709/227 |
| 6,288,811 | B1 | * | 9/2001 | Jiang et al. | 398/79 |
| 6,411,412 | B1 | * | 6/2002 | Jiang et al. | 398/59 |
| 6,411,418 | B1 | * | 6/2002 | Deri et al. | 398/182 |
| 6,414,767 | B1 | * | 7/2002 | Blair et al. | 398/59 |
| H002075 | H | * | 8/2003 | Gnauck et al. | 398/58 |
| 6,636,529 | B1 | * | 10/2003 | Goodman et al. | 370/469 |
| 6,687,432 | B2 | * | 2/2004 | Schemmann et al. | 385/24 |
| 6,735,211 | B1 | * | 5/2004 | Karasawa | 370/412 |
| 6,771,908 | B2 | * | 8/2004 | Eijk et al. | 398/66 |
| 6,912,361 | B2 | * | 6/2005 | Aronson et al. | 398/135 |
| 7,013,084 | B2 | * | 3/2006 | Battou et al. | 398/45 |
| 7,027,849 | B2 | * | 4/2006 | Al-Ali | 600/323 |
| 7,103,907 | B1 | * | 9/2006 | Buabbud | 725/129 |
| 7,170,859 | B2 | * | 1/2007 | Yamada et al. | 370/245 |
| 7,298,974 | B2 | * | 11/2007 | Tanobe et al. | 398/63 |
| 7,301,973 | B2 | * | 11/2007 | Shouji et al. | 372/20 |
| 7,330,656 | B2 | * | 2/2008 | Lee et al. | 398/78 |
| 7,385,995 | B2 | * | 6/2008 | Stiscia et al. | 370/412 |
| 7,447,398 | B2 | * | 11/2008 | Hirai et al. | 385/17 |
| 7,502,563 | B2 | * | 3/2009 | Nozue et al. | 398/69 |
| 7,627,246 | B2 | * | 12/2009 | Sorin et al. | 398/63 |
| 2001/0027542 | A1 | * | 10/2001 | Sugeno | 714/43 |
| 2001/0030785 | A1 | * | 10/2001 | Pangrac et al. | 359/125 |
| 2002/0002709 | A1 | * | 1/2002 | An | 725/109 |
| 2002/0024698 | A1 | * | 2/2002 | Jiang et al. | 359/127 |
| 2002/0038372 | A1 | * | 3/2002 | Idehara et al. | 709/227 |
| 2002/0063924 | A1 | * | 5/2002 | Kimbrough et al. | 359/125 |
| 2002/0063932 | A1 | * | 5/2002 | Unitt et al. | 359/168 |
| 2002/0106148 | A1 | * | 8/2002 | Schemmann et al. | 385/24 |
| 2002/0118413 | A1 | * | 8/2002 | Yamada et al. | 359/118 |
| 2003/0002103 | A1 | * | 1/2003 | Erfani et al. | 359/127 |
| 2003/0012485 | A1 | * | 1/2003 | Neeley et al. | 385/16 |
| 2003/0039266 | A1 | * | 2/2003 | Hojo et al. | 370/465 |
| 2003/0058505 | A1 | * | 3/2003 | Arol et al. | 359/168 |
| 2003/0128983 | A1 | * | 7/2003 | BuAbbud et al. | 398/71 |
| 2003/0147652 | A1 | * | 8/2003 | Green et al. | 398/118 |
| 2003/0174713 | A1 | * | 9/2003 | Linden | 370/396 |
| 2003/0194241 | A1 | * | 10/2003 | Farmer | 398/167.5 |
| 2004/0136712 | A1 | * | 7/2004 | Stiscia et al. | 398/60 |
| 2004/0141759 | A1 | * | 7/2004 | Stiscia et al. | 398/168 |
| 2004/0179855 | A1 | * | 9/2004 | Harada | 398/197 |
| 2004/0202299 | A1 | * | 10/2004 | Schwartz | 379/142.01 |
| 2004/0208537 | A1 | * | 10/2004 | Lee et al. | 398/41 |
| 2005/0013613 | A1 | * | 1/2005 | Stevenson et al. | 398/60 |
| 2005/0138670 | A1 | * | 6/2005 | Ploumen | 725/118 |
| 2006/0222375 | A1 | * | 10/2006 | Raddatz | 398/195 |
| 2008/0019691 | A1 | * | 1/2008 | Guignard et al. | 398/48 |
| 2008/0095535 | A1 | * | 4/2008 | Zou | 398/58 |
| 2008/0138072 | A1 | * | 6/2008 | Sakamoto et al. | 398/68 |
| 2008/0304828 | A1 | * | 12/2008 | Mizutani et al. | 398/78 |
| 2009/0047016 | A1 | * | 2/2009 | Bernard et al. | 398/43 |
| 2009/0067838 | A1 | * | 3/2009 | Chen et al. | 398/58 |

OTHER PUBLICATIONS

Jian-Guo Z., "Real-time communication networks based on optical fiber code-division multiple-access scheme", ISA Transactions, Instrument Society of America, vol. 35, No. 3, pp. 205-215, 1996.

* cited by examiner

MULTISERVICE PRIVATE NETWORK AND INTERFACE MODULES FOR TRANSPORTING, ON SUCH A NETWORK, DATA IN DIFFERENT FORMATS

RELATED APPLICATIONS

This is a U.S. National Phase Application under 35 USC 371 of International Application PCT/FR2005/001706 filed on Jul. 1, 2005.

FIELD OF THE INVENTION

The present invention relates to a multiservice private network architecture and to interface modules each dedicated to interfacing a given terminal equipment in a multiservice private network.

The invention lies in the field of communications networks, and more particularly in the field of optical networks for private or indoor applications. The expressions private networks and indoor networks refer more particularly to networks used by persons in their home.

The invention typically finds a particular application in the interconnection via the same network of different and heterogeneous terminal equipments so that mutually compatible terminals communicate directly with each other without interfering with communication between other terminals of different kinds. The expression heterogeneous equipments refers to equipments capable of conveying data with different formats. For example, a television, a computer, and an audio system are heterogeneous equipments because they convey data that do not all have the same format.

The invention therefore combines services offered by a telecommunications operator with other, domestic services that the telecommunications operator does not offer. It therefore becomes possible, for example, to relay signals from a UHF television antenna into any room of the home or to relay signals from an audio source to remote sound reproducing devices situated in other rooms of the home.

BACKGROUND OF THE INVENTION

There is renewed interest in private networks because of the evolving offer in terms of telecommunications services, because of voice/data/picture convergence, and because of the penetration of computers into the home. A private network generally includes a gateway that interfaces the private network with an access network that is external to the private network and that is managed by a telecommunications operator. The gateway generally also has the functions of organizing exchanges between the private network equipments and of isolating local traffic from external traffic.

At present there are several solutions for implementing private networks. Non-cable solutions use radio or free space optical techniques. However, radio solutions lack confidentiality, which compromises the security of the data. They are also vulnerable because they are readily affected by interference caused by environmental conditions and furthermore offer a limited bit rate. Solutions based on unguided infrared optics also have their limitations. In fact, their bit rate is limited if the sender and the receiver are not in direct line of sight of each other. To obtain a higher bit rate, it is necessary for the sender and the receiver to be in line of sight of each other, which represents a severe constraint for the user.

Other solutions, using cables, rely on a cabling architecture. Numerous media exist for providing such cabling, essentially copper in the form of twisted pairs, coaxial cables, or power cables, and monomode or multimode silica, polymer, or other material optical fibers.

Different standards have appeared for using these media, promoted by telecommunications, computers, and electronics, audio, and video interests. The standards that have been developed are protocols such as ATM (Asynchronous Transfer Mode), IP (Internet Protocol), Ethernet, etc., which are independent of the physical medium and define particular specifications for the format of the data according to the medium used.

Cable solutions using copper cables in the form of twisted pairs, promoted by telecommunications interests, make it possible to use the access network and to extend it to the home. In this case, the data is conveyed in a standard telecommunications format, such as the IP or ATM format. However, these solutions continue to suffer from limitations because they cannot convey signals necessitating high bandwidth. For example, twisted pair cables cannot carry UHF signals from a UHF television antenna. These solutions therefore do not make it possible to integrate new developments.

Where coaxial cables are concerned, experience shows that, in the residential context, existing networks are linked solely to the distribution of UHF television signals. These networks are often of mediocre quality and the cabling topology does not correspond to that of a private network. Complete recabling is therefore necessary in practice, yielding a solution of too limited performance to face up to new developments.

With the recent expansion of the HomePlug Powerline Alliance AV standard, it is now possible to produce a residential network via the electrical mains wiring. The benefit of this technique is that it is not necessary to install any additional cables, and it should be possible to transmit useful bit rates of around 100 mega bits per second (Mbps) for real bit rates of 200 Mbps, although current solutions offer a bit rate of the order of only a few Mbps. The technique uses dedicated modems to convey the high bit rate signals over the electrical mains wiring. This technology is very attractive, but the bit rate is still limited and all the data must be formatted in the same manner, and so combining heterogeneous services cannot be seriously envisaged. In the context of increasing the bit rate of residential networks, this technology is therefore equally inadequate to meet the constraints of the residential core network.

Figure 1:
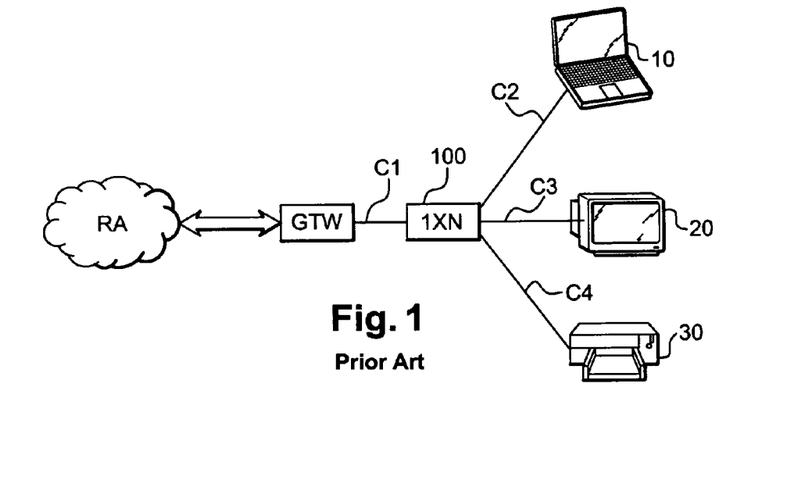
FIG. 1, already described, shows a prior art PON type private network architecture.

Finally, another, more promising solution using optical fiber cables has been envisaged. Given the service life that indoor cables must offer and the uncertainty as to the bandwidth requirements during the service life of the network, optical fiber cables constitute the most open-ended solution. One such solution uses an architecture based on the architectures of PON (passive optical network) type access networks. This solution is shown in the diagram of FIG. 1. This kind of architecture includes a gateway GTW connected by optical fiber cables C1-C4 and via a 1 to N optical coupler 100 to a plurality of equipments, for example a personal computer 10, a television decoder and receiver 20, a printer 30, etc. In this case, the gateway is situated at the head end of the network and it is the gateway that manages the traffic, since all of the data exchanged passes in transit through it. That traffic may go from an operator's access network to a terminal in the private environment or vice-versa. Thus the computer 10 may communicate with the printer 30 or the external network via the optical coupler 100 and the gateway GTW.

This solution still has its limitations, however. In fact, it does not enable two remote equipments to dialogue directly without passing through the gateway, which has to manage everything necessary for establishing communication between the two equipments. The fact that all the traffic, even local traffic between two private equipments, must pass in transit through the gateway again requires the corresponding signals to be transposed to a precise format, comprehensible to the gateway. Consequently, this solution is limited in terms of the domestic services it is able to deliver. For example, it cannot relay signals from a UHF television antenna or relay signals from an audio source to remote sound reproduction devices in another room. With this type of architecture, the domestic services provided are therefore very limited and users will not be able to access all the services that they require.

Consequently, regardless of the medium adopted, all current solutions impose constraints on the format of the information transported. Private networks implemented until now make all services offered by the external access network that the user wishes to transport compatible with the gateways, i.e. convey data in the same single format.

SUMMARY OF THE INVENTION

One object of the present invention is to provide a multiservice private network comprising access points and destination points to which N terminal equipments are connected, said private network being configured to effect a summation of all signals injected at each access point and then broadcast that summation to all destination points, which would make it possible to connect different terminal equipments to the same network regardless of the format of the data that they carry and to interconnect compatible terminals so that they can communicate directly. This kind of network architecture would then allow a multitude of domestic services and services provided by an external access network to be superposed and would obtain complete isolation between the various services so that all interference would be avoided.

This and other objects are attained in accordance with an embodiment of the present invention by virtue of the fact that the signals summed and broadcast take the form of a wavelength division multiplex, and that N interface modules are connected on a one-to-one basis to the N terminal equipments, each of said N interface modules being adapted to send and/or receive data in a format appropriate to the terminal equipment that is connected to it, said format being particular to a specific wavelength, in order to interconnect via said private network at least two mutually compatible terminal equipments among said N terminal equipments.

Thus the conjoint use of interface modules and of wavelength division multiplexing technology enables heterogeneous terminals to be connected to the same network and mutually compatible terminals to be interconnected so that they communicate with each other directly. The network can thus carry different types of services at the same time as providing complete isolation, each service being carried between particular terminal equipments on a particular wavelength.

Moreover, each interface module sends on a specific wavelength and receives on a specific wavelength that may be the same as the sending wavelength or different therefrom, and communicates with one or more other modules sending on its receive wavelength and receiving on its send wavelength. The modules communicating with each other then enable the terminal equipments connected to them to be interconnected. It is therefore possible to create subnetworks of interconnected equipments, and a single piece of equipment may be connected to two different subnetworks. Accordingly, interconnected equipments forming a first subnetwork are able to exchange data in a first format that is compatible with them and that is different from a second format for data exchanged between interconnected terminal equipments in another subnetwork.

This kind of private network thus makes it possible to distribute voice/data/picture services in the various rooms of a home, whether they come from an operator access network, internal sources associated with the user, such as an audio system, video equipment, etc., or from other sources associated with other operators such as UHF television, cable TV, or satellite TV. This kind of private network can also carry control signals for controlling domestic appliances. By means of the network architecture according to the invention, it is therefore possible for highly diverse services to cohabit whatever their format.

Another aspect of the present invention provides an interface module that has a simple structure so that the unit cost is as low as possible and is adapted to be connected to a terminal equipment of a multiservice private network to provide an interconnection via the multiservice private network between at least two mutually-compatible terminal equipments in order for them to communicate with each other directly in a format that is specific to them.

This module is noteworthy in that it is adapted to send and/or receive data in a format that is appropriate to the terminal equipment that is connected to it, said format being particular to a specific wavelength, in order to enable interconnection via said multiservice private network of said terminal equipment and at least one mutually compatible terminal equipment among N other terminal equipments.

According to another feature of the invention, this module comprises:

a send data formatting unit adapted to adapt signals coming from the terminal equipment that is connected to it and to transform them into a signal adapted to the constraints of transmission by said private network;

control electronics for receiving the signal processed by the send data formatting unit and adapted to control an optical sender for sending said signal at a specific wavelength;

an optical receiver for selecting and detecting, from a set of signals of a wavelength division multiplex, a signal at a specific wavelength intended for the terminal equipment that is connected to it;

receive electronics adapted to transform the electrical signal from the optical receiver into an electrical signal compatible with a receive data formatting unit adapted to convert the signal coming from the receive electronics into a signal comprehensible to the terminal equipment that is connected to it.

Accordingly, data exchanged over the private network is received by an interface module at a receive wavelength and is then processed by a receive interface consisting of the receive data formatting unit and the receive electronics. The processed data is then forwarded to the terminal equipment connected to the module in a format comprehensible to that terminal equipment. The terminal equipment in turn sends data to one or more other equipments over the network. A send interface consisting of the send data formatting unit and the control electronics of the optical sender thus processes data from the equipment and then forwards it to the optical sender, which sends it over the network at a specific wavelength. The module therefore sends and receives data in a particular format at a specific wavelength selected from a number n of wavelengths usable to carry a particular service in the network. Each interface module connected to a terminal equipment thus carries a specific service compatible with that terminal equipment. Thus the same network can carry different types of services, as a function of the terminal equipments and the modules connected to it, without the different services interfering with each other.

According to another feature of the invention, the send data formatting unit and the control electronics form a send interface, the receive data formatting unit and the receive electronics form a receive interface, and said module is formed of an appropriate assembly of a send interface, a receive interface, an optical sender and an optical receiver adapted to the application to which it is dedicated.

This feature is particularly advantageous because, in the context of implementing a multiservice private network, it enables fast and easy implementation of an interface module dedicated to a particular terminal equipment and to a particular service, by assembling appropriate elements.

BRIEF DESCRIPTION OF THE DRAWINGS

Other features and advantages of the invention will become apparent on reading the following description, given by way of illustrative but non-limiting example and with reference to the appended drawings, in which.

DETAILED DESCRIPTION OF THE DRAWINGS

Figure 2:
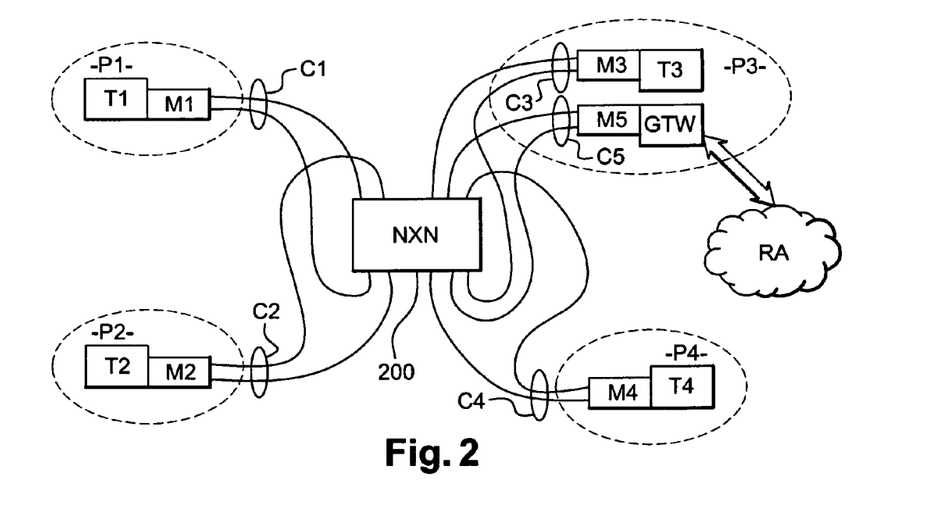
FIG. 2 is a block diagram of a private network architecture according to an embodiment of the invention.

FIG. 2 is a theoretical diagram of a network architecture according to an embodiment of the present invention. This private network architecture more particularly provides optical cables providing the function of a broadcast and select type network without any intermediate opto-electronic or electro-optical conversion, and in combination with wavelength division multiplexing technologies. The expression "broadcast and select" type network refers to a network comprising access points and destination points and configured to effect the summation of all signals injected at each access point and then to broadcast the result of that summation to all destination points. The access and destination points are generally co-located.

One practical and efficient way to implement this kind of network consists in using a passive star optical coupler 200, as shown in FIG. 2. Accordingly, signals from each access point reach the ports of the N×N coupler, which effects the summation of those signals and broadcasts them in the form of a wavelength division multiplex (WDM) to all destination points. On reception of these signals, a particular device M1-M5 connected to each destination point selects and detects a signal at a wavelength chosen from all the wavelengths of the multiplex and then forwards the selected signal to a terminal equipment T1-T4, GTW that is connected to it.

In this example, the cabling around the N×N passive optical coupler 200 is star cabling. It may be executed, for example, with twin-fiber cables C1-C5 or with pairs of single-fiber cables, etc., each fiber terminating at an access point and a destination point, to provide bidirectional transmission. The cables connect this coupler to optical connection points M1-M5 situated in the various rooms P1-P4 of the premises in which the network is installed. The various terminal equipments T1-T4 to be connected, situated in different rooms P1-P4 of those premises, are connected to the destination points of the private network via these optical connection points M1-M4, also referred to hereinafter as interface modules. In fact, each terminal equipment is connected to an interface module that is dedicated to it.

In a different embodiment, a more complex module may be used, enabling a plurality of heterogeneous or other terminal equipments to be connected to the module.

A gateway GTW is connected to an external access network RA and to the private network. The gateway is connected thereto in exactly the same way as to any other equipment, i.e. via an interface module M5.

In a different embodiment, the gateway may be co-located with the passive coupler 200, possibly in the same casing.

The interface modules are adapted to enable interconnection of at least two mutually-compatible terminal equipments from all of the terminal equipments connected to the private network. In fact, by means of these interface modules, each of which can send and/or receive at a particular wavelength, it is possible to create subnetworks of interconnected equipments. It is likewise possible to envisage connecting a single piece of terminal equipment to two different subnetworks.

Services originating from the access network RA pass in transit through the gateway GTW, which distributes them in the private premises. The user can also use this gateway GTW to process local traffic if so desired, on condition of then working at the same wavelength as the network federated by this gateway and interconnecting the terminal equipments via interface modules using the same data format. In the description below, services processed by the gateway, which in general originate from a telecommunications operator's access network, are called first order services.

Figure 3:
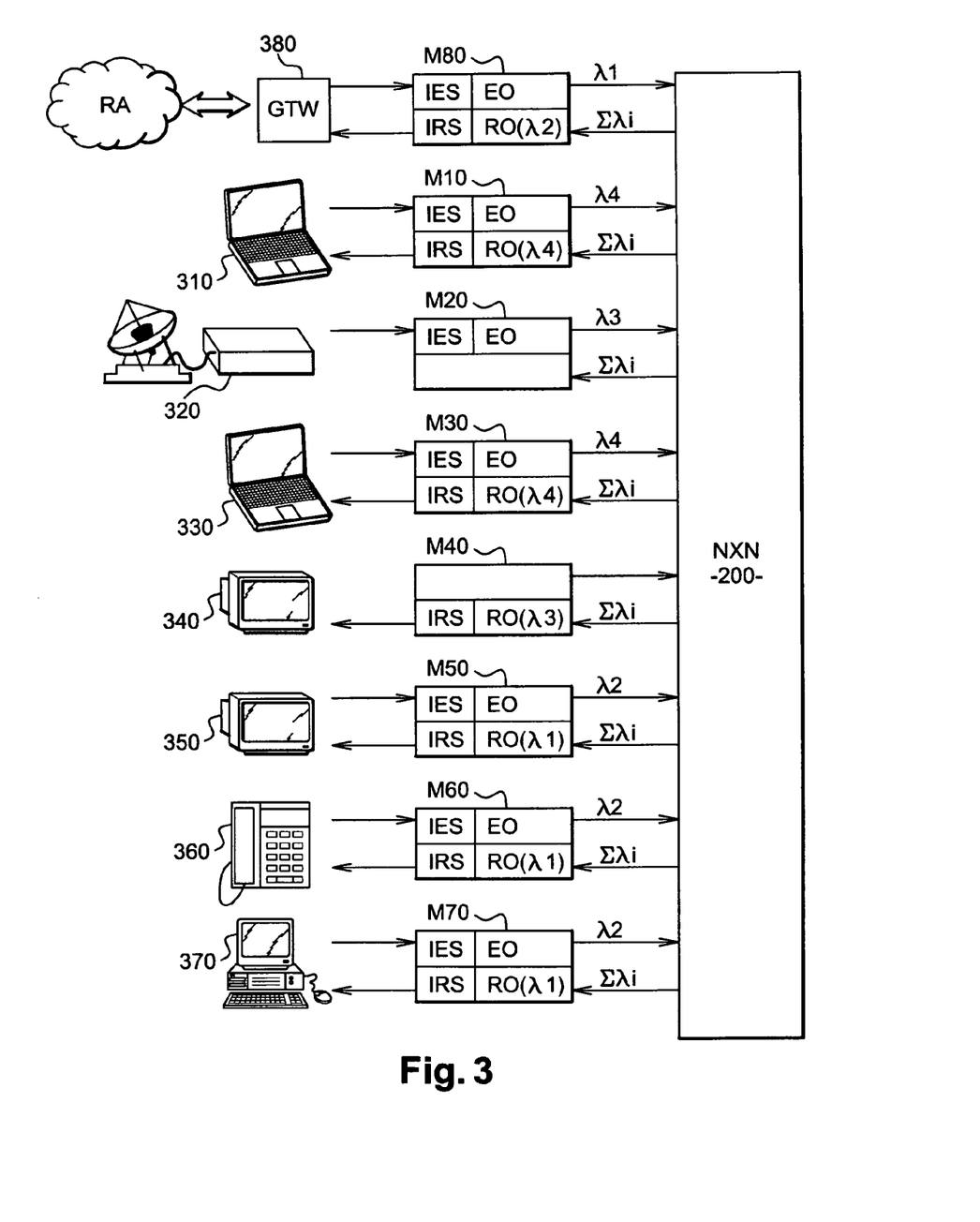
FIG. 3 shows the FIG. 2 architecture implemented in a particular application.

An embodiment of this architecture in one particular application is shown in FIG. 3. A gateway 380 broadcasts information via an interface module M80 and on a wavelength $\lambda 1$ to equipments 350, 360, and 370 which are, for example, a television associated with an appropriate decoder, an IP telephone, and a computer, respectively. In this case, the information passing through the gateway is in a format comprehensible to it, i.e. an ATM or IP format, for example. Communication between the gateway 380 and the terminal equipments 350, 360, and 370 therefore use a "virtual" PON with $\lambda 1$ as the downlink wavelength and $\lambda 2$ as the uplink wavelength, via interface modules M50, M60, M70, M80 connected to the terminal equipments to be interconnected 350, 360, 370, 380, respectively. In this example, the exchange between the gateway 380 and the equipment 370 corresponds to an Internet data type service, the exchange between the gateway 380 and the equipment 360 corresponds to a telephone over IP service, and the exchange between the gateway 380 and the equipment 350 corresponds to a digital image broadcasting service originating in the access network. The gateway 380, the television 350 and its decoder, the IP telephone 360, and the computer 370 then form a first subset of interconnected equipments.

Also, the equipment 320 is connected to a satellite receiver system, which broadcasts at the wavelength $\lambda 3$ a television program in a format delivered by the satellite receiver which is received by the television type equipment 340. In this case, the equipments 320 and 340 form a second subnetwork of interconnected equipments. In this example, the equipment 320 is dedicated to sending, and so the interface module M20 that is connected to it has no receiver elements, to reduce its cost. Likewise, the interface module M40 connected to the equipment 340 dedicated to receiving has no send components. In another application, the send components in the module M40 and receive components in the module M20 may be retained for transferring remote control instructions, for example.

Another subnetwork of interconnected equipments is constituted, at the same time, by connecting the equipments 310 and 330 via interface modules M10, M30 sending and receiving at the same wavelength λ4. These terminal equipments (for example two computers) then form a local area network (LAN) type subnetwork and exchange data in an Ethernet-type format, this subnetwork being isolated from the remainder of the private network and from the access network because the wavelength used is different from the wavelength of the first subnetwork federated by the gateway 380.

Because of the presence of these interface modules, a user can therefore use infrastructure of the private optical network to carry services of any kind corresponding to the user's own requirements, with no format constraints and with no interference with first order traffic coming from the gateway 380.

Figure 4:
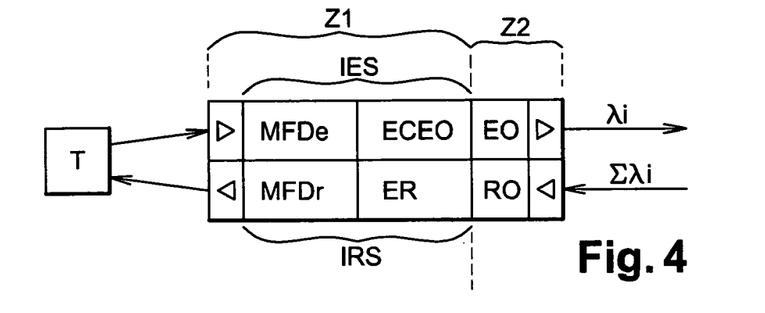
FIG. 4 is a block diagram of an interface module according to an embodiment of the invention intended for a particular application.

FIG. 4 is a theoretical diagram of an interface module according to an embodiment of the invention. An interface module of this kind includes, on the application side, i.e. on the side of the terminal equipment T that is connected to it, an electronic data processing area Z1, and on the private network side an optical signal processing area Z2.

The electronic processing area Z1 provides the interface with the terminal equipments to be connected, which implies being able to act on or to reproduce signals adapted to the application concerned. To this end, if the module is designed to operate in both transmission directions, the area Z1 includes for each transmission direction, firstly, a unit MFDe for formatting send data originating from the terminal equipment that is connected to it and control electronics ECEO and, secondly, receive electronics and a unit MFDr for formatting receive data going to the terminal equipment.

The area Z2 includes optical components to enable interfacing with the optical infrastructure and to provide the isolation between the different services carried simultaneously by the network. This area is used to send and/or receive data at a particular wavelength. To this end, the area Z2 includes an optical sender EO connected to an access point of the private network and an optical detector associated with an optical receiver RO connected to a destination point of the private network.

The unit MFDe for formatting the send data adapts the signals coming from the terminal, which are generally electrical signals, and transforms them into a signal to be transmitted over the optical network.

The control electronics ECEO drive the optical sender EO. They receive as input the signal resulting from the processing by the unit MFDe of the data present at the input of the module. It drives a light source, for example a laser, used in the optical sender to modulate the signal at a specific wavelength. In a simple embodiment, this portion adapts the signal coming from the unit MFDe to the characteristics of the send component.

In a more complex embodiment, this portion may additionally control the sending wavelength of the optical sender.

The optical sender EO then transforms the signal coming from the control electronics ECEO into an optical signal adapted to the characteristics of the network corresponding to the invention, i.e. a particular wavelength λi enabling the corresponding service to be separated from the other services.

In the context of producing a low-cost system, a send component is used that sends at a fixed wavelength.

However, in a different embodiment, the wavelength of this component could be tunable. In this case, sender strips are used, for example. The optical sender EO can therefore be implemented in several ways. For example, it may send at a fixed wavelength with a low spectral bandwidth or at a switchable wavelength with a low spectral bandwidth. In another example, the sender is sends at a tunable wavelength with a low spectral bandwidth. To give a further example, the optical sender may be designed to send a wide spectral band. In this case, it is associated with a narrow spectral filter to retain at the output of the system only a signal of low spectral bandwidth.

Furthermore, from amongst the signals reaching it at various wavelengths $\Sigma\lambda i$, an optical receiver RO retains only the signal that its function is to receive, for the intended application, at a particular wavelength $\lambda i$, and detects the signal to transform it into an electrical signal. Depending on the embodiment, this optical receiver may be fixed, i.e. adapted to receive only a given wavelength, or it may be tunable. In the fixed case, it is a question of associating a fixed spectral optical filter and a photoreceiver. The optical filter then selects the wavelength arriving at the photodetector. In the tunable case, it is a question of associating a tunable spectral optical filter and a photoreceiver, or a more complex component providing the two functions of tunable optical filtering and photodetection.

The receive electronics ER process the signal coming from the optical receiver RO. They amplify and reshape the low-level electrical signal supplied by the photodetector of the optical receiver, such as a photodiode, for example, to render this signal compatible with subsequent electronic processing by the unit MFDr.

The unit MFDr for shaping receive data executes a function symmetrical to that executed by the unit MFDe. Based on the signal coming from the network, this portion must send back signals for the application envisaged that are comprehensible to the terminal.

A plurality of embodiments of the module are possible, whether the aim is the lowest possible cost or the greatest simplicity of use, subject to making the module technically more complex.

It is possible to envisage a universal module integrating, on the application side, most of the connectors encountered for the services envisaged on the network and the entire panoply of elements MFDe, ECEO, ER, MFDr compatible with these new services and, on the network side, the wavelength tunable elements EO and RO. This module would nevertheless be complex and therefore of high cost.

To remain compatible with mass market consumer applications, the implementation of the interface modules must be oriented to achieving low costs. This implies designing a range of modules as a function of the services envisaged. In this context, the optical components, optical senders, receivers, filters may be identical, apart from the wavelength chosen, regardless of the service for which the module is intended.

An advantageous embodiment consists in fact in producing a modular module by assembling components as a function of the envisaged application. In this case, the send elements MFDe and ECEO of the area Z1 may be associated in a service send interface IES, for example, and likewise the receive elements ER and MFDr of the area Z1 may be associated in a service receive interface IRS.

The IES and IRS elements adapted to the service to be provided may then be assembled to produce a dedicated module. For example, there may be assembled in this way IES and IRS elements adapted to relay signals from an audio source or an IES element adapted to relay signals from UHF antennas or IES and IRS elements adapted to connect a PC, and so on.

The FIG. 4 interface module may be applied to a "domestic telecom PON" type service. In this case, this kind of interface module establishes communication between the gateway and the equipments (computer, IP telephone, decoder unit for digital animated picture services, etc.) connected to the module, which imposes a format for the data sent or received. This equipment therefore has, on the application side, in the data formatting MFDe or MFDr unit, standardized interfaces of the Ethernet, ATM or other types, and, on the private network side, the appropriate optical elements, such as an optical sender EO of fixed and calibrated wavelength or tunable wavelength, an optical wavelength filter and a photodetector.

Figure 5:
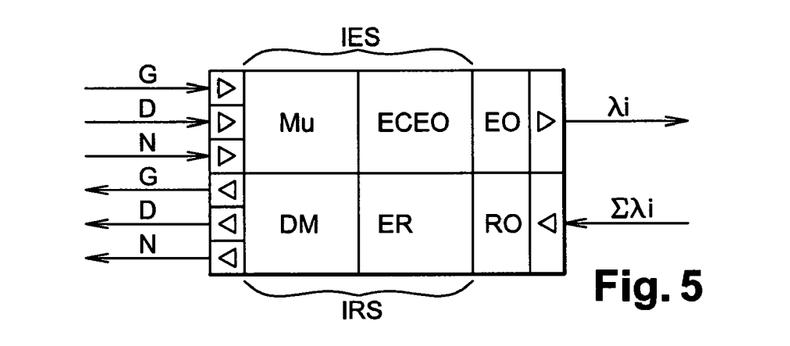
FIG. 5 is a diagram of another embodiment of the FIG. 4 interface module intended for a second particular application.

FIG. 5 is a diagram of another example of an interface module adapted to broadcast audio signals in all the rooms of a premises from a source belonging to the user such as an audio system, for example. The interface module represented here may be used at both ends, i.e. two similar modules may be connected, one to the audio system that generates the audio signals and the other to sound reproducing equipment, such as an amplifier with associated loudspeakers. The left-channel signal G and the right-channel signal D are digitized and then electronically multiplexed (signal Mu). When a digital type signal N is available on the equipment of the user, it is also multiplexed with the previously digitized signals G and D. The signal resulting from this multiplexing modulates the optical sender EO. On reception, after the optical receiver RO has selected the signal, the signals are demultiplexed by a demultiplexer DM and are then available to be fed, in this example, to an audio amplifier with associated loudspeakers.

In another embodiment, the modules may be simplified by dedicating them either to sending or to receiving, the module dedicated to sending being used at the audio signal source end and the module dedicated to receiving being used at the sound reproduction equipment end.

Figure 6:
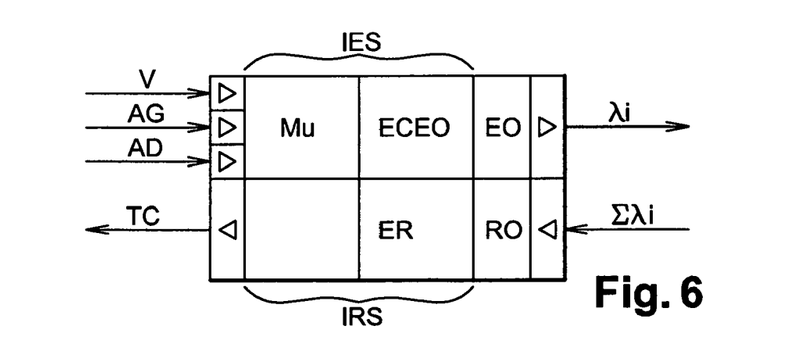
FIG. 6 is a diagram of another embodiment of the FIG. 4 interface module intended for a third particular application.

FIG. 6 is a diagram of one example of a "base band" video type interface module. This interface module broadcasts pictures from a private source of the DVD player, videorecorder or satellite receiver type in a format appropriate to this type of service, as a function of the equipments available to the user. The video signal V, left-channel audio signal AG and right-channel audio signal AD from that source are multiplexed electronically (signal Mu) and then sent to the network by the optical sender EO. The receive system of this module feeds remote control functions TC back to the equipments. A similar interface module with the input/outputs interchanged is used at the image reception end, i.e. at the television monitor end, for example.

Figure 7:
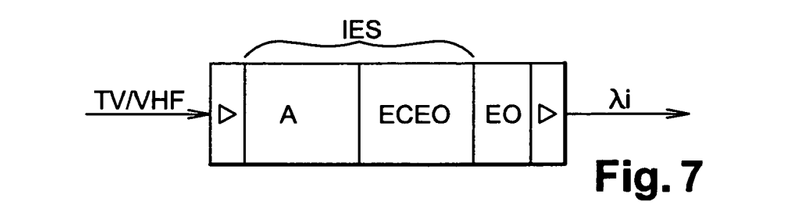
FIG. 7 is a diagram of a further embodiment of the FIG. 4 interface module intended for a further particular application.

FIG. 7 is a diagram of a video (VHF/UHF band) or radio (VHF band) type interface module that makes available within the premises signals respectively received by a VHF/UHF receive antenna designed to receive broadcast television services or a VHF antenna designed to receive broadcast radio programs. To this end, the send data formatting unit MFDe comprises an electronic processing stage A such as an amplifier, for example, for making the characteristics of the signal to be broadcast compatible with those of the transmission signal. This signal is then sent over the private network to serve all the rooms of the premises. The radio or television signals are then available to feed a radio tuner, a television receiver or a recorder. The characteristics of the control electronics ECEO and the optical sender EO must allow for the wide spectrum to be transmitted and the linearity constraints for this type of signal. Only the send channel is shown, the receive channel being a priori of no utility in this application.

A further possible service consists in creating, if the user requires it, a LAN type network on another wavelength that is isolated from the network federated by the gateway and therefore "invisible" to the latter.

A further type of service consists in controlling various home automation functions. Because of the presence of the interface modules, the provision of this type of service does not necessitate homogenization of all of the formats of all of the control signals that may be encountered in this field.

Although specific embodiments of the present invention have been described above, the person skilled in the art will understand that diverse modifications and adaptations may be made without departing from the scope of the present invention.

The proposed cabling architecture has a number of advantages. Thus fiber-based cabling is open-ended, which represents a great advantage because, the service life of a building being long, the network must be able to evolve over this period without too many major modifications. The architecture is transparent to the point where it provides virtually absolute flexibility. In fact it enables cohabitation of diverse domestic services and structured telecommunications-type services with very different formats. Moreover, the architecture is coherent, in the sense that the number of access points generally envisaged is compatible with the state of the art in this technology in terms of numbers of ports of passive optical couplers and with the number of wavelengths that can be used in a low-cost CWDM (coarse wavelength division multiplex) type approach, for example. The link balances are also compatible with the distances encountered in the environment concerned, enabling the use of multimode silica, or even polymer, fibers, a factor in reducing the cost of the network, in particular by simplifying the connectors.

The invention claimed is:

1. A multiservice private network comprising access points and destination points configured to provide connection for N terminal equipments having a plurality of data formats, said private network comprising:

a coupler that sums all signals injected at each access point and broadcasts the summed signals to all destination points, the summed signals taking a form of a wavelength division multiplex (WDM);

N interface modules that are configured to be respectively associated with the N terminal equipments, each of said N interface modules being adapted to perform at least one of sending and receiving data in a data format, from among the plurality of data formats, appropriate to the respective terminal equipment associated with it, each of said data formats being particular to a specific wavelength, in order to:

interconnect solely at a first wavelength via said private network at least two mutually compatible terminal equipments in a first group from among said N terminal equipments that use a first data format, and interconnect solely at a second wavelength at least two mutually compatible terminal equipments in a second group from among said N terminal equipments that use a second data format.

2. The network according to claim 1, wherein each of said N interface modules comprises an electronic processing area for transforming the signal delivered by the terminal equipment into a signal adapted for transmission by said private network or, conversely, to transform a signal carried by said private network into a signal comprehensible to the terminal equipment if said signal is intended for it, and an optical processing area for at least one of sending and receiving said signal at a specific wavelength.

3. An interface module comprising:
- a connection that is adapted to be connected to a terminal equipment of a multiservice private network and;
- an element that performs at least one of sending and receiving data in a first data format, from among a plurality of data formats, that is appropriate to said terminal equipment and is particular to a specific wavelength, in order to;
  - enable interconnection solely at a first wavelength via said multiservice private network of said terminal equipment and at least one mutually compatible terminal equipment among N other terminal equipments that uses the first data format; and
  - enable interconnection solely at a second wavelength via said multiservice private network of at least two mutually compatible terminal equipments from among N other terminal equipments using a second data format.

4. An interface module according to claim 3, wherein the interface module comprises:
- a send data formatting unit adapted to process signals coming from the terminal equipment that is connected to it for transmission by said private network;
- control electronics for receiving the signal processed by the send data formatting unit and adapted to control an optical sender for sending said signal at a specific wavelength;
- an optical receiver for selecting and detecting, from a set of signals of a wavelength division multiplex, a signal at a specific wavelength intended for the terminal equipment that is connected to it and to produce an electrical signal;
- receive electronics adapted to amplify the electrical signal produced from the optical receiver; and
- a receive data formatting unit adapted to convert the amplified signal coming from the receive electronics into a signal comprehensible to the terminal equipment that is connected to it.

5. An interface module according to claim 4, wherein the send data formatting unit and the control electronics form a send interface, the receive data formatting unit and the receive electronics form a receive interface, and said module is formed of a selected assembly of a send interface, a receive interface, an optical sender and an optical receiver, said selected assembly being adapted to the application to which it is dedicated.

6. A multiservice private network for connecting terminal equipment units having a plurality of data formats, the network comprising:
- a plurality of interface modules providing access points and destination points for connection to the terminal equipment units, each interface module having a predetermined data format from among the plurality of data formats;
- a coupler connected to the plurality of interface modules and configured to sum signals received at the access points of the interface modules to form a wavelength-division-multiplexed (WDM) signal, including a plurality of wavelengths, and broadcast the WDM signal to the destination points of the interface modules,
wherein each of the data formats has a corresponding predetermined exclusive wavelength from among the plurality of wavelengths, so as to provide interconnection solely at a first frequency between at least two compatible terminal equipment units in a first group using a first data format, from among the plurality of data formats, while also providing interconnection solely at a second frequency between at least two compatible terminal equipment units in a second group using a second data format, from among the plurality of data formats.

* * * * *